Figure 1:
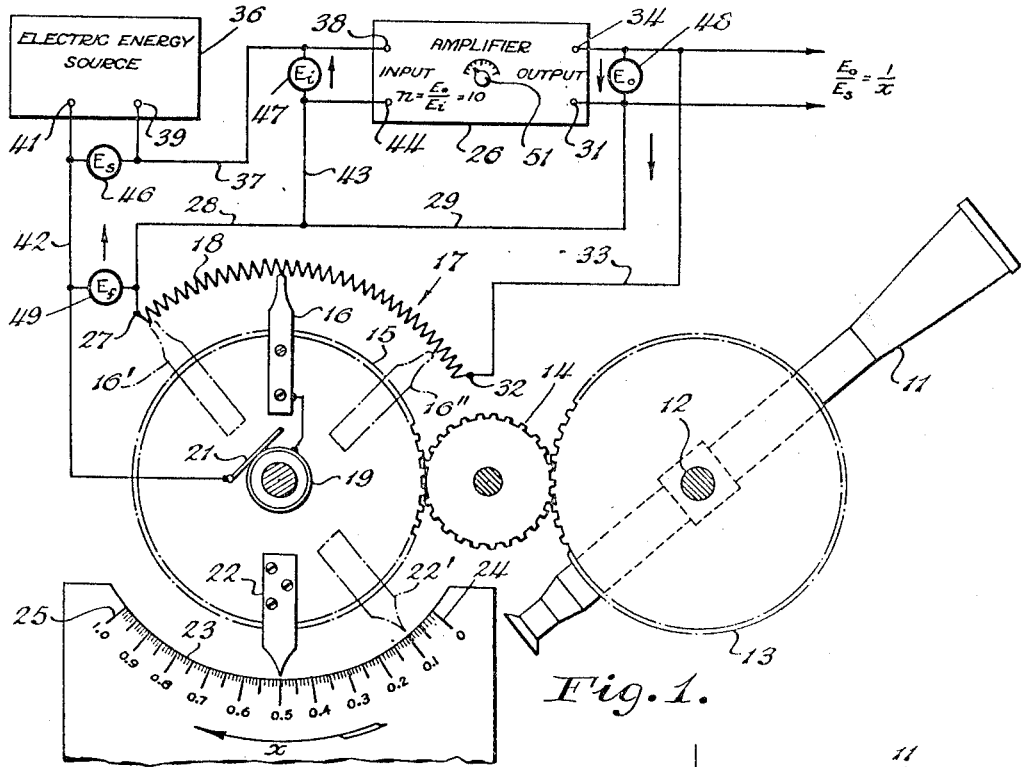

March 27, 1951     H. HARRIS, JR     2,546,156
COMPUTER APPARATUS

Filed Nov. 30, 1944     2 Sheets-Sheet 1

INVENTOR
HERBERT HARRIS, JR.
BY Paul B. Hunter
ATTORNEY

INVENTOR
HERBERT HARRIS, JR.
BY Paul B. Hunter
ATTORNEY

Patented Mar. 27, 1951

2,546,156

UNITED STATES PATENT OFFICE 2,546,156

COMPUTER APPARATUS

Herbert Harris, Jr., Cedarhurst, N. Y., assignor to The Sperry Corporation, a corporation of Delaware Application November 30, 1944, Serial No. 565,964

8 Claims. (Cl. 250—27)

The present invention relates to systems for producing an electrical signal voltage or current varying as a desired function of the mechanical movement or displacement of an object.

In systems for use in tracking the movements of distant objects, it is often necessary to produce a signal voltage varying as a perdetermined mathematical function of a mechanical movement. For example, some tracking systems require production of a voltage varying precisely as the secant of the angle of rotation of a movable object such as a telescope. In the prior art, well-known devices such as potentiometers and variable-coupling transformers have been provided for producing signals varying as relatively simple functions of the movement of an object. Such devices have been used to produce a signal voltage varying in direct proportion to the angular movement of an object, or in proportion to the sine or cosine of the angle of displacement of a rotatable object from a reference position.

Where it is necessary to produce a unidirectional voltage or an alternating voltage of magnitude varying linearly with the angle of rotation of a device, such as a telescope, a potentiometer having a uniform-gradient resistance winding, e. g. a winding arranged for a resistance gradient of 10 ohms per degree rotation of a slidable or movable contact arm, may be coupled to a telescope or other movable object. The potentiometer stator portion, usually including the resistance element or winding, may be connected to the telescope supporting structure; while the relatively movable portion of the potentiometer, usually a rotatable contact arm, may be coupled to the telescope for movement therewith. A direct-current source or an alternating-current source may be electrically connected to the two ends of the resistance winding, and the voltage produced between one end of the resistance winding and the movable contact arm varies in direct proportion to the angle through which the rotatable object or telescope is turned.

Where it is necessary to produce an alternating voltage varying in amplitude in proportion to the sine or cosine of the angle of rotation of an object such as a telescope, a rotatable, variable-coupling transformer device of the general class known as self-synchronous alternating-current positional repeater units, such for example as a "Selsyn" unit, may be employed instead of the potentiometer discussed above. The rotor of such a variable transformer device may be connected directly to the rotatable object or telescope and the stator of the device may be connected rigidly to the telescope supporting frame. An alternating-current source may be electrically connected to one winding of the rotatable transformer, e. g. to a rotatable winding portion thereof. In such an arrangement, an alternating voltage is induced in a stator winding, and the amplitude of this induced voltage varies as the sine of the angle through which the telescope is turned from a position producing minimum coupling of the two coils, or the cosine of the angle through which the telescope is turned from a position producing maximum coupling of the coils.

In the first-described apparatus for producing a voltage varying in direct proportion to the angle of rotation of the telescope, the resistance gradient required in the potentiometer resistance element is uniform. If desired, however, the resistance gradient may be varied by a special distribution of the resistance material around the stator of the potentiometer in such a way as to produce a potentiometer output voltage varying as the sine or cosine of the angle of rotation of the movable contact arm.

The range of variation of the resistance gradient within a potentiometer resistance element or winding is relatively limited by practical considerations. If the function required to be represented by the output voltage of such a potentiometer is a reciprocal function of the angle of rotation of the contact arm, or if it is a secant or cosecant function of this angle, the output voltage gradient is required to vary over an extremely wide range, which may approach the range from zero gradient to an infinite gradient.

For this purpose, the construction of a potentiometer having a resistance element arranged for accurate resistance gradient variation over the required range is extremely difficult, as the resistance gradient per degree rotation of the contact arm is required to vary over a very wide range, e. g. a range of the order of 1,000 to 1 or greater.

Similarly, the requirement of such extreme functions would make necessary very drastic modifications in a rotatable transformer device, at the sacrifice of construction simplicity, ruggedness and accuracy. Accordingly, it would be very difficult, if not impossible, to manufacture uniform products of either of these two types for the purpose set forth above.

With these considerations in view, it is an object of the present invention to provide apparatus capable of producing an output signal variable as a predetermined function over an extremely wide range in accordance with the movement or displacement of a movable object from a reference position.

It is a further object of the present invention to provide apparatus capable of producing an output signal voltage or current of intensity or amplitude varying according to a reciprocal function of the angle of rotation, or of the sine or cosine of the angle of rotation, of a rotatable object.

In accordance with the present invention, a functional potentiometer or a variable transformer device mechanically coupled to a movable object such as a rotatable telescope, for example, is connected in an inverse feedback circuit of an amplifier, to serve as a precisely controllable energy-transfer device for causing the output signal strength of the amplifier to vary precisely in inverse proportion to the displacement of the movable body from a reference position, e. g. the angular displacement of the rotatable telescope from a predetermined reference position. If desired, the precisely controllable energy-transfer device may be so constructed and arranged, or so coupled to a rotatable object, as to produce variations of the amplifier output intensity in proportion to the secant or cosecant of the angle of displacement of the rotatable object from a predetermined reference position.

Figure 2:
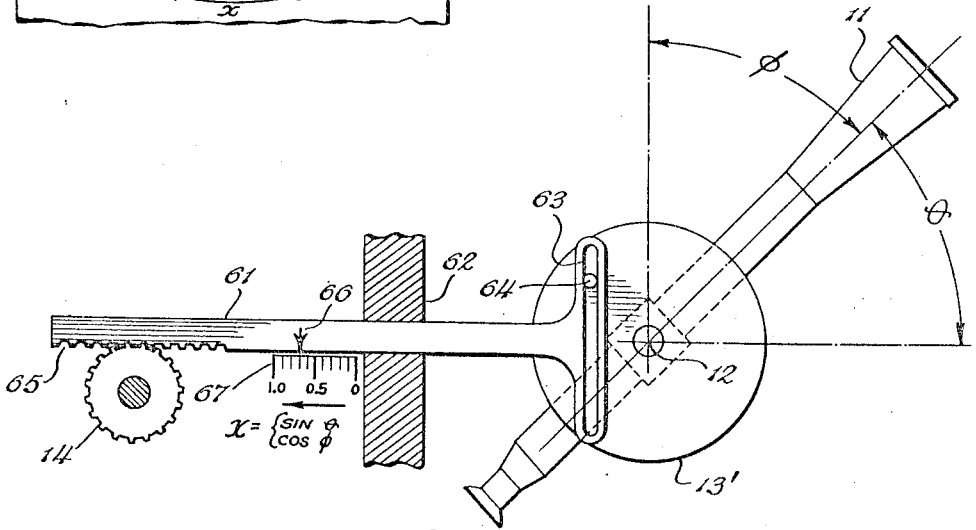
Figure 3:
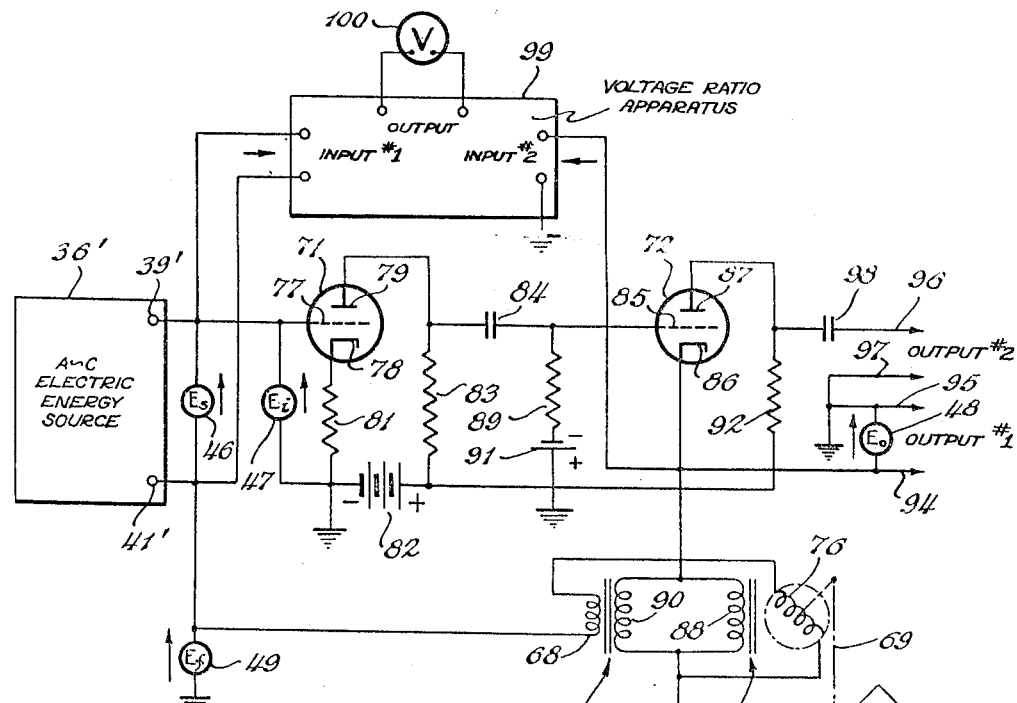
Figure 4:
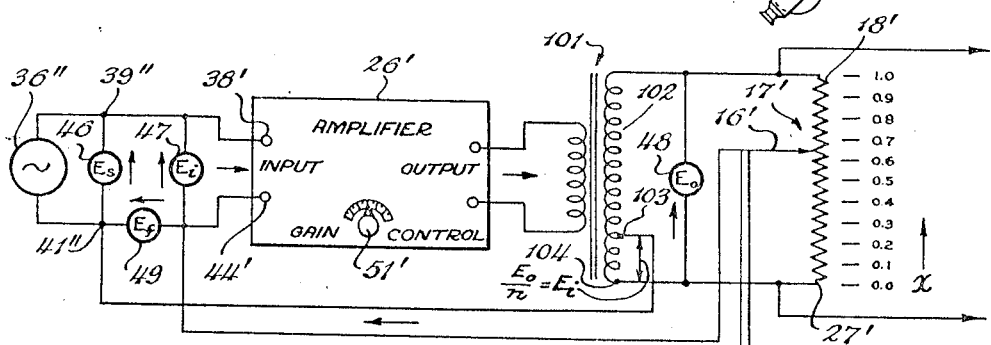

The foregoing objects and general description of the invention will be more clearly understood, and other objects will be made evident, by reference to the following detailed description in conjunction with the accompanying drawings, wherein Fig. 1 illustrates an embodiment of the present invention including a linear-gradient potentiometer coupled to a movable object and connected in an inverse feedback circuit of an amplifier for producing an amplifier output voltage varying in inverse proportion to the angular displacement of the object;

Fig. 2 illustrates a modified linkage for coupling a rotatable object to a linear-gradient potentiometer for causing variation of an amplifier output voltage in proportion to the secant or cosecant of the angle of rotation of the object;

Fig. 3 illustrates a rotatable transformer device connected in an amplifier inverse feedback circuit and adapted for precise energy-transfer variation sinusoidally in accordance with the movement of one winding of the device relative to another; and Fig. 4 illustrates a further embodiment of the present invention including an amplifier feedback control, a potentiometer having an output circuit connected in opposition to a relatively fixed portion of the amplifier output voltage $E_o$.

Referring now to Fig. 1, a telescope 11 is shown arranged for rotation about axis 12. Telescope 11 is connected through a chain of gears including a first gear 13, an idler gear 14 and a further gear 15 to the movable element, such as the wiping contact arm 16, of an attenuator or variable energy-transfer device such as a potentiometer 17. The contact arm 16 is arranged to provide a movable connection to a linear-gradient resistance winding 18 of the potentiometer 17. A slip-ring 19 and a brush 21 are provided for connection to the movable arm 16 of the potentiometer.

Attached to the potentiometer rotor assembly (including gear 15 and movable contact arm 16) is an indicator arm 22, arranged to cooperate with a linear-gradient calibration scale 23, denoting the variation of the angular displacement $x$ of the telescope 11 from a reference position corresponding to the alignment of the indicator arm 22 with the zero index 24 of scale 23.

The potentiometer resistance winding 18 is connected to the output circuit of an amplifier 26. As shown in Fig. 1, one end terminal 27 of the resistance winding 18 is connected by conductors 28 and 29 to one output terminal 31 of the amplifier 26, while the other end terminal 32 of the resistance winding 18 is connected by conductor 33 to the other output terminal 34 of the amplifier 26. With this arrangement, the voltage applied to the resistance winding 18 between terminals 27 and 32 is the full output voltage, $E_o$, of the amplifier 26, and the potentiometer output voltage $E_f$ produced between one end terminal 27 and the contact brush 21 of potentiometer 17 varies relatively to the amplifier output voltage $E_o$ in direct proportion to the displacement of the contact arm 16 from the end terminal 27 of the resistance winding 18.

An electric energy source 36 is shown in Fig. 1 having one of its output terminals, 39, connected by conductor 37 to an input terminal 38 of the amplifier 26. The coupling of the energy source 36 to the input circuit of the amplifier 26 is completed by connection of the other output terminal 41 of the energy source to the contact brush 21 by conductor 42, and by the connection of the end terminal 27 of the potentiometer resistance winding 18 by conductor 43 to a second input terminal 44 of the amplifier 26.

If desired, voltmeters 46, 47, 48 and 49 may be connected, respectively, in shunt with the output circuit of electric energy source 36, the input circuit of the amplifier 26, the output circuit of amplifier 26 and the output circuit of potentiometer 17, for indicating the respective voltage intensities $E_s$, $E_i$, $E_o$ and $E_f$ at these locations in the apparatus. Also, amplifier 26 may be provided with an amplification or gain control 51 for adjusting the amplification factor or ratio of output voltage $E_o$ to input voltage $E_i$.

By virtue of the connection of the input circuit 27, 32 of potentiometer 17 to the output circuit of amplifier 26 and the output circuit 27, 21 of potentiometer 17 in series with the electric energy source 36 and the input circuit of the amplifier 26, the potentiometer 17 is enabled to serve as a variable energy-transfer device for feeding into the input circuit 38, 44 of the amplifier 26 a voltage $E_f$ equal to a variable fraction of the output voltage $E_o$, in series opposition to the voltage $E_s$ supplied by the energy source 36. This is accomplished in such a manner as to maintain the amplifier input voltage $E_i$ (measured by voltmeter 47) equal to the algebraic sum of $E_s$ and $E_f$ ($E_f$ being of opposite polarity with respect to $E_s$), and thus to control the ratio $E_o/E_s$ of the amplifier output voltage to the electric energy source voltage. In order to produce variation of the amplifier output voltage $E_o$ precisely in inverse proportion to the displacement $x$ of the telescope 11 from a reference position corresponding to the indication $x=0$, certain requirements hereinafter set forth must be met in the adjustment of the amplification factor of amplifier 26 and the relative positions of the elements of the potentiometer 17 employed as a variable energy-transfer device.

Since the apparatus illustrated in Fig. 1 is not suited for production of an infinite output voltage, an output voltage inversely proportional to zero displacement of the pointer 22 from the zero index 24 cannot be achieved. Actually, the output voltage $E_o$ may be made to vary over a very wide range from a maximum output level accompanying the displacement of telescope 11 through a very small value of $x$, to a relatively small output voltage $E_o$ accompanying the maximum displacement of telescope 11 and the registration of indicator arm 22 with the calibration mark 25 for $x=1.0$.

A suitable set of conditions for producing an output voltage $E_o$ varying precisely in inverse proportion to values of $x$ in the range from 0.1 to 1.0 is illustrated in Fig. 1. The amplification factor $n$ of the amplifier 26 (the ratio $E_o/E_i$) is adjusted to the value 10 by means of the amplification control 51. The linear-gradient resistance winding 18 of the potentiometer 17 is so positioned that the movable potentiometer contact arm 16 is in contact with the end terminal 27 of the winding 18 when the indicator arm 22 registers with the calibration mark representing $x=0.1$. This condition is represented by the broken-line illustrations 16', 22'. With this condition, the fraction of the output signal $E_o$ of the amplifier 26 fed back to the input circuit thereof is reduced to zero $$\left(\frac{E_f}{E_o}=0\right)$$

so that the ratio of the output voltage $E_o$ to the energy source voltage $E_s$ equals 10, the illustrative value of the amplification factor $n$ of the amplifier 26.

When the indicator arm 22 registers with the calibration mark 25 representing $x=1.0$, arm 16 has moved from the resistance winding end 27 to a position 16'', nine-tenths $$\left(\frac{n-1}{n}\right)$$

of the distance along winding 18 from the end 27 to the end 32; and the fraction of the voltage fed back from the output circuit of the amplifier 26 to the input circuit—the ratio $E_f/E_o$—is thus equal to $\frac{9}{10}$. The overall amplification of the voltage $E_s$, as represented by the fraction $E_o/E_s$, is then unity, as given by the equation $$\frac{E_o}{E_s}=\frac{n}{1+n\frac{E_f}{E_o}}$$

or $$\frac{E_o}{E_s}=\frac{10}{1+10\times\frac{9}{10}}=1$$

For intermediate positions of the contact arm 16, corresponding to positions of the indicator arm 22 for values of $x$ greater than 0.1 and less than 1.0, the ratio of the output voltage $E_o$ to the source voltage $E_s$ varies precisely in inverse proportion to the value $x$ of the displacement of the pointer 22 from the zero reference index 24, and thus in inverse proportion to the angular displacement of the telescope 11 from a reference position accompanying registration of arm 22 with zero index 24.

If it is desired that the voltage $E_o$ be made to vary in precise proportion to values of $x$ over a range more closely approaching $x=0$, as for example, over a range of $x$ from 0.01 to 1.0, the amplification of amplifier 26 may be made correspondingly higher, as with $n$ equal to 100, and the potentiometer resistance winding 18 may be so positioned that arm 16 is adjacent the end 27 thereof when the indicator arm 22 registers with 0.01 on the scale 23. The contact arm 16 will then reach a position 99% of the distance from end 27 to end 32 when the indicator arm 22 registers with the maximum displacement index 25 for $x=1.0$.

Thus, it is seen that a potentiometer 17 with a linear-gradient resistance winding 18 having an extent substantially equal to the angular extent of the scale 23, but displaced from precise angular correspondence with the scale 23 by a factor corresponding to $$x=\frac{1}{n}$$

is employed in the inverse feedback circuit of the amplifier 26

$$\left(\text{of gain } \frac{E_o}{E_i}=n\right)$$

in such a manner that the output voltage $E_o$ varies precisely in inverse proportion to the variation of the displacement $x$ of the indicator arm 22 from the zero reference, over a range of movement of the indicator arm 22 determined by the amplification factor $n$ of amplifier 26. This range, defined as $$\frac{1}{n}<x<1.0$$

may be made to approach very closely the entire range of $x$ from 0 to 1.0 if the amplification factor $$\left(n=\frac{E_o}{E_i}\right)$$

of amplifier 26 is made very large, as for example $n=100$, or even $n=1,000$.

If it is desired that the output voltage $E_o$ vary as either the secant or the cosecant of the angle of rotation of a movable object such as telescope 11 about an axis 12, the variable energy-transfer device driven by the telescope 11 and connected in the inverse feedback circuit of amplifier 26 must vary the energy-transfer ratio $E_f/E_o$ in proportion to the difference between a constant value (corresponding to $1/n$) and either the cosine or the sine of the angle of rotation of the telescope 11, rather than in linear relation to this angle.

A simple mechanical arrangement adaptable to the potentiometer 17 of Fig. 1 for this purpose is shown in Fig. 2. A mechanical linkage including a translatable member 61 is provided intermediate the disc member 13' and idler gear 14. The translatable member 61 is supported for translatory motion through sliding contact with a stationary guide 62, and is provided with a slot 63 perpendicular to the axis of translation of the member, for cooperation with an eccentric crank pin 64 secured in the disc 13'. The translatable member 61 includes gear teeth 65 forming a rack thereon adapted to cooperate with the teeth of the idler gear 14, through which the member 61 may be adapted to drive a potentiometer in the manner shown in Fig. 1. The translatable member 61 cooperates with the disc 13' and the crank pin 64 in a well-known manner to provide translatory movement proportional to the sine of the angle $\theta$ and also to the cosine of the angle $\phi$, as is indicated by the cooperation of a reference pointer 66 on the member 61 with a linear calibration scale 67 which may be fixedly positioned with respect to the axis of rotation 12 of the telescope 11.

With a linear-taper potentiometer 17 coupled to the idler gear 14 in the manner shown in Fig. 1 and with the idler gear 14 coupled to the telescope 11 in the manner shown in Fig. 2, the ratio $E_f/E_o$ may be made to vary as the difference between the displacement $$x = \frac{1}{n}$$

and the sine or cosine of the displacement of the telescope 11 (from axis b—b or from axis a—a, respectively), rather than in a fixed ratio to such displacement. Accordingly, the output $E_o$ of the amplifier 26 is made to vary as the reciprocal of the sine or cosine ($\sin \theta$ or $\cos \phi$) of the displacement angle of the telescope 11, and therefore as the cosecant or the secant of the angle of displacement of the movable object 11 (i. e. as cosecant $\theta$ or secant $\phi$).

In accordance with the one feature of the present invention, a variable-coupling transformer may be used as the variable energy-transfer device in the feedback circuit of an amplifier, for varying the feedback ratio $E_f/E_o$ in accordance with the difference between a constant value $1/n$ and the sine or cosine of the angle of movement of a movable body such as the rotatable telescope 11. An alternating-current self-synchronous motor of the type generally known as a "Selsyn" may be employed as the variable transformer or energy-transfer device, coupled to a movable object such as telescope 11. The variable transformer is energized by the amplified output of an amplifier, and is coupled to the input circuit of the amplifier for introducing therein a voltage $E_f$ varying relative to the output voltage $E_o$ according to the sine or cosine of the angle of displacement of the telescope 11.

In Fig. 3 is shown a circuit arrangement adapted to operate in the above-described manner, with a rotatable transformer 73 connected as a variable energy-transfer device between the output circuit and the input circuit of a two-stage amplifier including electron discharge devices 71 and 72. An alternating-current electric energy source 36' having output terminals 39' and 41' is shown connected to the input circuit of the amplifier. Terminal 39' is connected directly to the control electrode or grid 77 of the first electron discharge device 71, which may be a triode vacuum tube, for example. The other terminal 41' of the energy source 36' is connected in series with the secondary winding 68 of a transformer 70 and the relatively movable secondary winding 76 of the variable transformer 73, to the grounded input terminal of the amplifier.

The cathode 78 of the device 71 is connected through a cathode bias resistor 81 to ground and to the negative terminal of an anode supply source 82. The anode 79 of the device 71 is connected through an anode load resistor 83 to the positive terminal of source 82. A coupling condenser 84 is connected between the anode 79 of the first electron discharge device 71 and the control electrode or grid 85 of the second electron discharge device 72, which also may be a triode vacuum tube. The control grid 85 of the second device 72 is provided with negative bias through a resistor 89 by bias potential source 91 having its positive terminal grounded. The anode 87 of the second amplifier tube 72 is connected through load resistor 92 to the positive terminal of source 82.

The primary windings 88 and 90 of the variable transformer 73 and the transformer 70 are connected in parallel between the cathode 86 of the second device 72 and ground. The variably-coupled secondary winding 76 of the transformer device 73 is so connected in the series circuit including secondary winding 68 and the terminal 41' of source 36' as to provide an output voltage component of opposite phase to the voltage $E_s$ supplied by the source 36'. The secondary winding 68 of the transformer 70 is so connected in this series circuit as to provide a voltage component of amplitude equal to the quotient of the amplified output voltage $E_o$ and the amplification factor $E_o/E_i$, and therefore equal to the amplifier input voltage $E_i$, in phase opposition to the voltage supplied by the variable transformer secondary winding 76 and thus cophasal with the voltage $E_s$ supplied by the alternating-current source 36'. A voltmeter 49 may be provided for indicating the feedback voltage $E_f$ produced by the secondary windings 76 and 68 connected in series opposition. Voltmeters 46, 47 and 48 may be provided as in the embodiment of Fig. 1, for indicating respectively the energy source voltage $E_s$, the amplifier input voltage $E_i$, and the amplifier output voltage $E_o$ produced across the transformer primary windings.

The rotatable winding 76 of the variable transformer device 73 is mechanically coupled to telescope 11 through a coupling system 69 which may comprise a gear train, for example. Conductors 94 and 95 may be provided for coupling the output voltage $E_o$ to a utilization device. Conductors 96 and 97 and a coupling capacitor 98 also may be provided for supplying an additional amplified output voltage to other devices, if desired.

The components 81, 83, 89 and 92, and the potential source 82, may be carefully selected for producing any desired amplification factor $$n = \frac{E_o}{E_i}$$

Variable transformer 73 is arranged to deliver a maximum output voltage equal to $E_o$, and to vary its output voltage in accordance with the cosine of the angle of displacement of the winding 76 from the maximum output position. As pointed out hereinbefore, transformer 70 is so constructed and connected as to provide a voltage component in secondary winding 68 of phase opposite to that of the voltage produced in the winding 76, and of amplitude equal to the quotient of the output voltage $E_o$ and the amplification factor $n$. Thus, the feedback voltage $E_f$ indicated by the voltmeter 49 and applied in series with the energy source 36' is given by the equation $$E_f = \frac{E_o}{n} - E_o \cos \phi = E_i - E_o \cos \phi$$

Under these conditions, the output voltage $E_o$ varies relative to the source voltage $E_s$ precisely in inverse proportion to the cosine of the angle of displacement $\phi$ of winding 76 from the maximum feedback voltage position and thus as the secant of angle $\phi$, as shown by the following table of equations:

(1) $\quad E_i = E_s + E_f$ (2) $\quad E_f = E_i - E_o \cos \phi$ (3) $E_i = E_s + E_i - E_o \cos \phi$ (from (1) and (2))

therefore (4) $\quad E_o \cos \phi = E_s$ and (5)

$$\frac{E_o}{E_s} = \frac{1}{\cos \phi} = \sec \phi$$

If the mechanical coupling 69 is so arranged as to provide angular displacement of the winding 76 equal to the angular displacement of the telescope 11, the output voltage $E_o$ then varies as the secant of the angle of displacement of telescope 11 from a normal reference position, or as the cosecant of the angle of displacement of the telescope 11 from a further reference position displaced 90° from the first-defined position.

If the source voltage $E_s$ is maintained constant, as by a voltage regulator, the indication of output voltmeter 48 is at all times proportional to $$\frac{E_o}{E_s} = \sec \phi$$

If the source voltage $E_s$ is variable, a signal intensity ratio indicating instrument may be provided for indicating directly the ratio $E_o/E_s$. Such a ratio indicating instrument is shown in Fig. 3 as comprising apparatus 99 for receiving two signals ($E_s$ and $E_o$) and producing an output voltage varying as the ratio of the two signals. A voltmeter 100 is connected to the output circuit of the voltage ratio apparatus, for indicating directly the ratio $$\frac{E_o}{E_s} = \sec \phi$$

The details of the apparatus 99 do not form part of the present invention and, therefore, the apparatus is generally indicated in Fig. 3. Any apparatus capable of producing a ratio-responsive signal may be employed. One form of apparatus for this purpose is shown in Fig. 8 of U. S. Patent 2,190,038, issued February 13, 1940, to Jacob Neufeld. As will be readily apparent, ratio indicating instruments may be added to any of the illustrated forms of the present invention.

If desired, the voltage $E_s$ may be varied according to any desired function, so that the output voltage $E_o$ may be made to vary as a product of such a function and $\sec \phi$.

The output voltage produced between conductors 96 and 97 is made to vary in proportion to the voltage $E_o$ between conductors 94 and 95, but may be of greater amplitude or of less amplitude than the voltage $E_o$, as desired.

The arrangement shown in Fig. 3 is not limited to use for an amplified output voltage $E_o$ varying relative to the source voltage $E_s$ as the secant or cosecant of the angular displacement of the transformer rotor portion 76. A rotatable transformer may be so constructed as to produce energy-transfer variation in a manner other than as the sine or cosine of the angle of rotation. For example, rotatable transformers have been so constructed and arranged as to produce secondary voltage variations proportional to the angle of rotation of the rotor, rather than in proportion to the sine or cosine of the angle of rotation of the rotor. With such a transformer, obviously, the arrangement of Fig. 3 may be used to produce an amplifier output voltage varying as the reciprocal of the angular displacement of the rotor, rather than the reciprocal of the sine or cosine of the angle of displacement thereof.

It will be apparent that the transformer 70 included in the apparatus shown in Fig. 3 provides a feedback voltage component serving the same purpose as that of the angular displacement of the potentiometer resistance winding 18 of Fig. 1 from angular correspondence with the scale 23. Actually, if desired, the arrangement of Fig. 1 could be modified by positioning resistance winding 18 with the end 27 opposite the zero index 24 and the end 32 opposite the maximum displacement index 25, and by supplying in series opposition to the potentiometer output voltage $E_f$ a further output voltage component equal to $E_o/n$ (and therefore equal to $E_t$), derived through a separate device, such as a transformer, from the output circuit 31, 34 of the amplifier 26.

A system generally similar to that of Fig. 1, but embodying a voltage bias arrangement as discussed in the above paragraph instead of a mechanical relative displacement of a potentiometer resistance winding with respect to the scale of $x$, is shown in Fig. 4. An electric energy source 36″ is shown coupled to the input circuit of an amplifier 26′ having a variable gain control element 51′. The output circuit of the amplifier 26′ is coupled through a transformer 101 to a potentiometer 17′ including a resistance winding 18′ and a movable arm 16′. Movable arm 16′ may be arranged for translatory movement along the winding 18′ of potentiometer 17′, and may be connected through a rack member 105, idler gear 14 and gear 13 to a rotatable telescope 11.

The secondary winding 102 of transformer 101 is tapped at a point 103 thereon near the winding end 104 connected to the end 27′ of potentiometer resistance winding 18′. The location of the tap 103 on transformer secondary 102 is so selected that the voltage produced between the tap 103 and the winding end 104 is equal to the voltage $E_t$ applied to the input circuit of amplifier 26′.

The tap 103 is connected to one output terminal 41″ of the source 36″, the other terminal 39″ of the source being connected directly to an input terminal 38′ of the amplifier 26′. The movable arm 16′ of potentiometer 17′ is connected to the other input terminal 44′ of amplifier 26′. If tap 103 is fixedly positioned on the secondary winding 102 of transformer 101, the gain control 51′ may be rotated to equalize the input voltage $E_t$ and the output voltage produced between tap 103 and the end 104 of the transformer secondary winding. As in the previous cases, voltmeters 46, 47, 48 and 49 may be provided for indicating the source voltage, the amplifier input voltage, the amplifier output voltage and the feedback voltage, respectively.

The equations which demonstrate the method of operation of the apparatus shown in Fig. 4 are set forth below:

(1) $\qquad E_t = E_s + E_f$ (2) $\qquad E_f = E_t - xE_o$ (3) $\qquad E_t = E_s + E_t - xE_o$ (from (1) and (2))

therefore (4) $\qquad xE_o = E_s$ and (5) $\qquad \dfrac{E_o}{E_s} = \dfrac{1}{x}$ As shown by Equation 5, the output voltage $E_o$ varies relative to the source voltage $E_s$ precisely as the reciprocal of the displacement $x$, with the movable potentiometer contact arm 16′ positioned a distance from the end 27′ of the resistance winding 18′ directly proportional to the displacement $x$.

Thus, four embodiments of the present invention have been shown for producing an output voltage varying accurately as a desired reciprocal function of displacement of a movable object.

or as a reciprocal function (such as a secant or cosecant function) of the sine or cosine of angular displacement of a rotatable object from a reference position. As illustrated here, either a potentiometer or a rotatable transformer may be employed for varying the feedback factor in an amplifier inverse feedback circuit linearly with the displacement of a movable object, or linearly with the sine or cosine of angular displacement of a rotatable object.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, an amplifier having an input circuit and an output circuit, an electric energy source coupled to said input circuit for supplying an electric signal to said amplifier, a transformer having a primary winding coupled to said output circuit to be energized by said amplifier and a secondary winding coupled to said amplifier input circuit to supply thereto a negative feedback signal in addition to the signal supplied by said source, said transformer having a positionally adjustable variable coupling element therein for varying the transfer coupling between said primary winding and said secondary winding, and means for supplying to said input circuit a signal derived from said amplifier output circuit and attenuated by a factor equal to the amplification factor of said amplifier, said last-named signal being supplied to said input circuit in phase opposition to said variable transformer feedback signal.

2. In combination, an object rotatable through a predetermined angular range of movement, a variable energy-transfer device coupled to said object for energy-transfer variation in accordance with the cosine of the angle of rotational displacement of said object from a reference position, an amplifier having an output circuit coupled to said device to supply an amplified signal thereto and an input circuit coupled to said device to receive therefrom a version of said amplified signal varying in accordance with the cosine of the angle of rotational displacement of said object from said reference position, the position of said object being independent of any voltage in said amplifier, and means for supplying to said input circuit a signal derived from said amplifier output circuit and attenuated by a factor equal to the amplification factor of said amplifier, said last-named signal being supplied to said input circuit in phase opposition to said variable energy-transfer signal.

3. Apparatus for producing an electric output signal varying in proportion to the reciprocal of the displacement of a movable object from a reference position, comprising: an amplifier having an input circuit and an output circuit, said amplifier being characterized by an amplification factor $n$ equal to the ratio of the amplifier output intensity to the amplifier input intensity; an electric energy source coupled to said input circuit to supply an electric signal to said amplifier; and a variable energy-transfer device having a movable energy-transfer control member adapted to be coupled to said movable object, an input circuit connected to said amplifier output circuit and an output circuit connected to said amplifier input circuit, said energy-transfer device being so arranged as to deliver to said amplifier input circuit a fraction of said amplifier output signal varying linearly with the displacement of said movable control member from a reference position, said fraction varying linearly from $$\frac{n-1}{n}$$

to 0 in accordance with the variation of said displacement from a first value to a fraction thereof given as the product of said first value of displacement and the fraction $1/n$.

4. Apparatus for producing an electric output signal varying in proportion to the reciprocal of a predetermined function of the displacement of a movable object from a reference position, comprising: an amplifier having an input circuit and an output circuit, said amplifier having an amplification factor $n$ equal to the ratio of the amplifier output intensity to the amplifier input intensity; an electric energy source coupled to said input circuit to supply an electric signal to said amplifier; and a variable energy-transfer device having a movable energy-transfer control member adapted to be coupled to said movable object, an input circuit connected to said amplifier output circuit, and an output circuit connected to said amplifier input circuit to supply thereto a feedback signal in opposition to the signal provided by said energy source, the intensity of said feedback signal having a constant finite magnitude for fixed positions of said movable object, and said movable object and variable energy transfer device being free from positional responsiveness to any voltage variations in the output circuit of said amplifier, said energy-transfer device being so arranged as to deliver to said amplifier input circuit a feedback signal of intensity equal to a fraction of said amplifier output signal intensity varying from $$\frac{n-1}{n}$$

to 0 in accordance with the variation of a predetermined function of said displacement from a first value $f$ to a fraction thereof represented by $f/n$.

5. Apparatus for producing an electric output signal varying in proportion to the reciprocal of the displacement of a movable object from a reference position, comprising an electric energy source for supplying a signal, an amplifier having an input circuit coupled to said source and an output circuit for reproducing an amplified version of the signal supplied by said source, said amplifier being characterized by an amplification factor $n$ equal to the ratio of the amplifier output intensity to the amplifier input intensity, an inverse feedback circuit coupled to said amplifier output and input circuits for feeding back to said input circuit a feedback signal in opposition to said source signal, and a potentiometer connected to said feedback circuit and coupled to said movable object for varying the strength of said feedback signal relative to the strength of said output signal in accordance with the displacement of said movable body from a predetermined reference position, said potentiometer being so arranged as to deliver to said amplifier input circuit a feedback signal of intensity equal to a fraction of said amplifier output signal intensity varying from $$\frac{n-1}{1}$$

to 0 in accordance with the variation of a predetermined function of said displacement from a first value $f$ to a fraction thereof represented by $f/n$.

6. Apparatus for producing an electric output signal varying in inverse proportion to the displacement of a movable object from a principal reference position, comprising an electric energy source for supplying a first signal, an amplifier having an input circuit coupled to said source and an output circuit for reproducing an amplified version of the signal supplied by said source, an inverse feedback circuit coupled to said amplifier output and input circuits for feeding back to said input circuit a feedback signal in opposition to said source signal, and means connected to said feedback circuit including a potentiometer coupled to said movable object for varying the strength of said feedback signal relative to said output signal in accordance with the displacement of said movable body from said reference position, said feedback signal strength varying means being so arranged as to vary the strength of said feedback signal relative to said amplifier output signal in proportion to the displacement of said object from a second position displaced by a predetermined distance from said principal reference position.

7. Apparatus for producing an electric output signal varying as the secant of the angle of displacement of a movable body from a reference position, comprising an amplifier having an input circuit and an output circuit, an electric energy source coupled to said amplifier input circuit for supplying a signal thereto, a variable coupling transformer having one winding coupled to said amplifier output circuit and a variably coupled winding connected to said input circuit for supplying to said input circuit a variable feedback signal in opposition to said source signal, said variable transformer being adapted to be coupled to a movable object for varying the coupling between said windings in accordance with the movement of said object, and means coupled to said input circuit for supplying thereto a further feedback signal in opposition to said variable feedback signal of intensity equal to the intensity produced in said input circuit.

8. Apparatus for producing an electric output signal varying as a desired function of the angle of rotation of the rotor of a variable coupling transformer, comprising an amplifier having an input circuit and an output circuit, an electric energy source coupled to said input ciruit for supplying a signal thereto, a variable transformer having an input winding and an output winding and a rotary member adapted to vary the coupling between said input winding and said output winding in accordance with the position of said member, said input winding being coupled to said amplifier output circuit and said output winding being coupled to said amplifier input circuit to supply thereto a feedback signal in opposition to said source signal, and means for supplying to said input circuit a signal derived from said amplifier output circuit and attenuated by a factor equal to the amplification factor of said amplifier, said last-named signal being supplied to said input circuit in phase opposition to said variable transformer feedback signal.

HERBERT HARRIS, Jr.

REFERENCES CITED

The following references are of record in the file of this patent:

UNITED STATES PATENTS

| Number | Name | Date |
|---|---|---|
| 2,098,968 | Mallinckrodt | Nov. 16, 1937 |
| 2,151,821 | Wilson | Mar. 28, 1939 |
| 2,237,604 | Marique | Apr. 8, 1941 |
| 2,358,480 | Skilling | Sept. 19, 1944 |
| 2,374,071 | Barton | Apr. 17, 1945 |
| 2,400,953 | Roys | May 28, 1946 |
| 2,404,387 | Lovell et al. | July 23, 1946 |
| 2,467,646 | Agins | Apr. 19, 1949 |